United States Patent
Miller et al.

(10) Patent No.: US 8,525,660 B2
(45) Date of Patent: Sep. 3, 2013

(54) DC POWER LINE CONTROL FOR LIGHT BARS AND SIRENS

(75) Inventors: Daniel S. Miller, Crestwood, KY (US);
Roger L. Miller, Crestwood, KY (US)

(73) Assignee: CODE 3, Inc., St. Louis, MO (US)

( * ) Notice: Subject to any disclaimer, the term of this patent is extended or adjusted under 35 U.S.C. 154(b) by 113 days.

(21) Appl. No.: 13/247,313

(22) Filed: Sep. 28, 2011

(65) Prior Publication Data

US 2012/0083975 A1    Apr. 5, 2012

Related U.S. Application Data

(60) Provisional application No. 61/388,839, filed on Oct. 1, 2010.

(51) Int. Cl.
*B60Q 1/26* (2006.01)
*B60Q 1/00* (2006.01)
*B60Q 5/00* (2006.01)
*H04B 3/54* (2006.01)

(52) U.S. Cl.
CPC .......... *B60Q 1/2611* (2013.01); *B60Q 1/0088* (2013.01); *B60Q 5/00* (2013.01); *H04B 3/548* (2013.01); *B60Q 2900/10* (2013.01); *H04B 2203/547* (2013.01); *H04B 2203/5483* (2013.01)
USPC .............................. 340/474; 340/468; 701/48

(58) Field of Classification Search
CPC ...... B60Q 1/0088; B60Q 1/2611; B60Q 5/00; B60Q 2900/10; H04B 2203/547; H04B 3/548; H04B 2203/5483
USPC .................................. 701/48; 340/468, 474
See application file for complete search history.

(56) References Cited

U.S. PATENT DOCUMENTS

| | | | |
|---|---|---|---|
| 6,317,052 B1 | 11/2001 | Welling et al. | |
| 6,906,817 B1 | 6/2005 | Berard et al. | |
| RE38,795 E | 9/2005 | Welling et al. | |
| 7,304,567 B2 * | 12/2007 | Canfield | 340/438 |
| 7,970,374 B2 * | 6/2011 | Riveiro et al. | 455/402 |
| 2006/0061329 A1 * | 3/2006 | Dawson | 320/115 |
| 2009/0092318 A1 | 4/2009 | Berard et al. | |
| 2009/0092320 A1 | 4/2009 | Berard et al. | |

OTHER PUBLICATIONS

Hushley, Jeff, Cypress Semiconductor Corporation, "Using CY8CPLC20 in Powerline Communication (PLC) Applications" Dec. 16, 2009, 19 pages.
Unknown, Cypress Semiconductor Corporation, "CY8CPLC10 Data Sheet; Powerline Communication Solution" Nov. 10, 2008, 29 pages.

* cited by examiner

*Primary Examiner* — James P. Trammell
*Assistant Examiner* — Todd Melton
(74) *Attorney, Agent, or Firm* — Senniger Powers LLP

(57) ABSTRACT

A light bar and/or a siren controlled by a control head via control signals on power lines connected to the control head, the light bar and/or the siren. Isolated power line communication (PLC) modules between the light bar, the siren and the control head transmit the control signals over the power lines.

19 Claims, 8 Drawing Sheets

DC POWER LINE CONTROL FOR LIGHT BARS AND SIRENS

BACKGROUND OF THE INVENTION

The present invention generally relates to controls for light bars and sirens and, in particular, a system in which a control head controls a light bar and/or a siren via signals over a power line.

FIG. 1 is a diagram of a light bar/siren and control head according to the prior art. In general, a control head 102 is hard wired to a siren 104 via a cable 106 which frequently has a plurality of wires (e.g., 8 wires). A light bar 108 is hard wired to the siren via a wire harness 110 which frequently has a plurality of wires (e.g., 16 wires). Each wire harness 106, 110 can be expensive and at times difficult to locate within a vehicle since the light bar 108 and siren 104 tend to be external to the vehicle and the control head 102 tends to be internally located within the passenger compartment.

This configuration of connecting the control head 102 to the siren 104 necessarily requires a multi-wire harness 110 between the siren 104 and the light bar 108 so that the control head 102 can control the operation of the light bar 108. There is a need for a more simplified and less expensive approach for interconnecting the control head with the siren and the light bar which also allows for easier installation.

SUMMARY OF THE INVENTION

In one form, the invention comprises a warning system for a vehicle having a battery and having electrical wires connected to the battery. An interface has an input side adapted to be connected to the electrical wires for receiving power and having an output side for supplying power. A light bar has a power input adapted to be connected to the output side of the interface for receiving power, has light heads connected to the power input for receiving power for energizing the light heads and has a light bar controller for receiving control signals for selectively operating the light heads to generate visual warning signals in response to received control signals. The interface, when connected between the power input and the electrical wires, isolates the electrical wires from electrical noise generated by the light bar. A light bar communication module is adapted to be connected between the light bar controller and the electrical wires on the input side of the interface for receiving control signals carried by the electrical wires and for providing corresponding control signals to the controller. A control head is responsive to operator input for providing control signals. A control head communication module is adapted to be connected between the control head and the electrical wires for receiving the control signals provided by the control head and for providing corresponding control signals to the electrical wires. As a result, control signals generated by the control head in response to operator input are provided to the control head communication module which provides corresponding control signals via the electrical wires to the light bar communication module which provides corresponding control signals to the controller to selectively energize the light heads by power provided via the interface to generate the visual warning signals.

In another form, the invention comprises a warning system for a vehicle having a battery and having electrical wires connected to the battery. An isolator having an input side is adapted to be connected to the electrical wires for receiving power and having an output side for supplying power. A light bar having a power input is adapted to be connected to the output side of the isolator for receiving power. The light bar has light heads connected to the power input for receiving power for energizing the light heads and has a light bar controller for receiving inter-integrated circuit (I²C) control signals for selectively operating the light heads to generate visual warning signals in response to received I²C control signals, wherein the isolator, when connected between the power input and the electrical wires, isolates the electrical wires from electrical noise generated by the light bar. A first power line communication module is adapted to be connected between the light bar controller and the electrical wires on the input side of the isolator for receiving power line transceiver (PLT) control signals carried by the electrical wires and for providing corresponding I²C control signals to the controller. A control head responsive to operator input provides I²C control signals. A second power line communication module is adapted to be connected between the control head and the electrical wires for receiving the I²C control signals provided by the control head and for providing corresponding PLT control signals to the electrical wires. The I²C control signals generated by the control head in response to operator input are provided to the second power line communication module which provides corresponding PLT control signals via the electrical wires to the first power line communication module which provides corresponding I²C control signals to the controller to selectively energize the light heads by power provided via the isolator to generate the visual warning signals.

In another form, the invention comprises a warning system for a vehicle having a battery and having electrical wires connected to the battery. The system is for use with a light bar having a power input for receiving power, having light heads connected to the power input for receiving power for energizing the light heads and having a light bar controller for receiving inter-integrated circuit (I²C) control signals for selectively operating the light heads to generate visual warning signals in response to received I²C control signals. The system is for use with a control head responsive to operator input for providing I²C control signals. An isolator has an input side adapted to be connected to the electrical wires for receiving power and has an output side adapted to be connected to the power input of the light bar for supplying power to the light bar. The isolator, when connected between the power input and the electrical wires, isolates the electrical wires from electrical noise generated by the light bar. A first power line communication module is adapted to be connected between the light bar controller and the electrical wires on the input side of the isolator for receiving power line transceiver (PLT) control signals carried by the electrical wires and for providing corresponding I²C control signals to the controller. A second power line communication module is adapted to be connected between the control head and the electrical wires for receiving the I²C control signals provided by the control head and for providing corresponding PLT control signals to the electrical wires. The I²C control signals generated by the control head in response to operator input are provided to the second power line communication module which provides corresponding PLT control signals via the electrical wires to the first power line communication module which provides corresponding I²C control signals to the controller to selectively energize the light heads by power provided via the isolator to generate the visual warning signals.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 2:
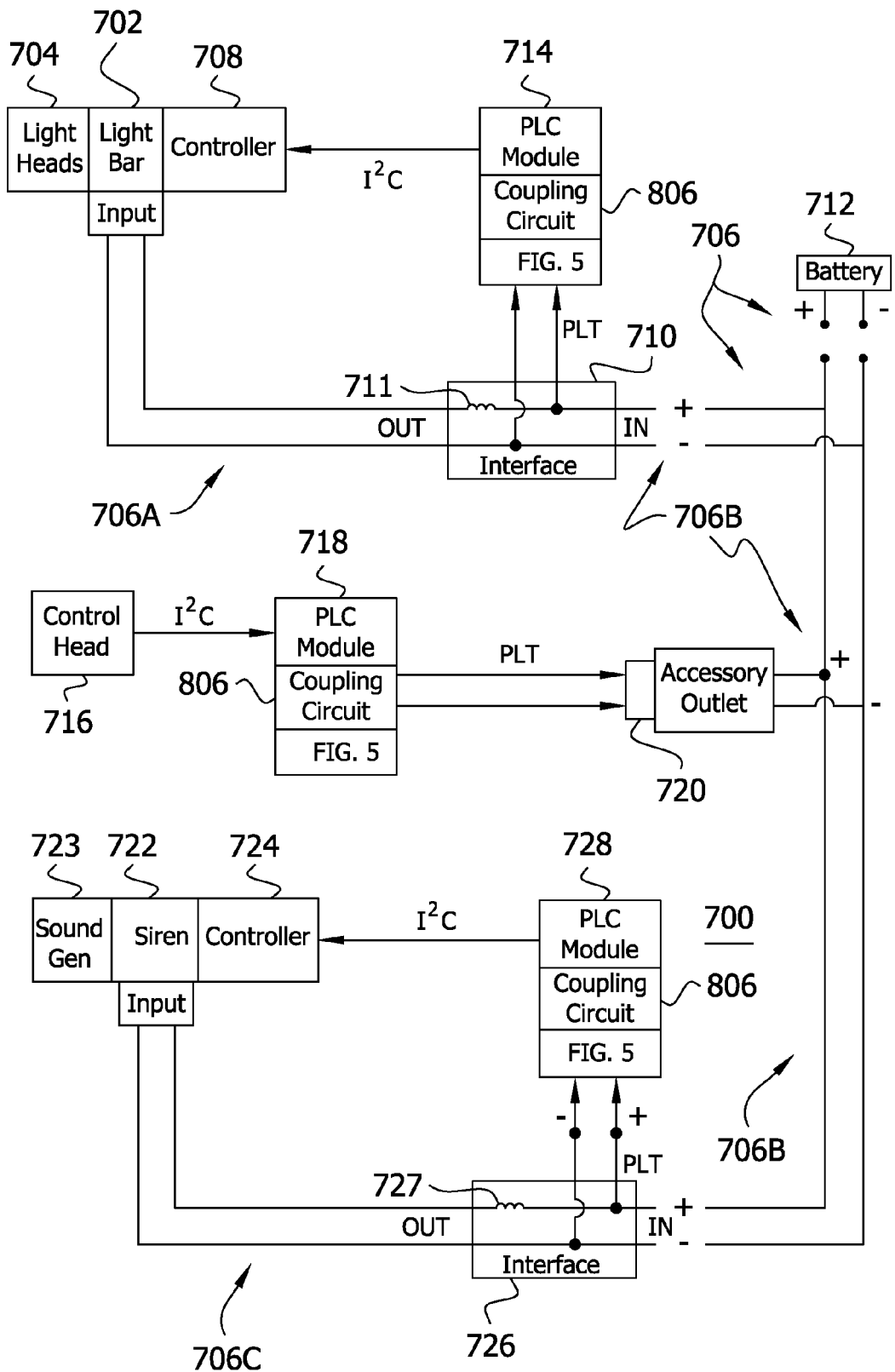
FIG. 2 is a diagram of a light bar/siren and control head according to one embodiment of the invention (not retrofit).

FIG. 2:

One embodiment of a system 700 of the invention is illustrated in FIG. 2. The system 700 is for use with DC power line wires 706 connected to a DC battery 712 of a vehicle. A light bar 702 has light heads 704 adapted to be connected to the power line wires 706A via a power input port for receiving power for energizing the light heads 704. The light bar 702 has a light bar controller 708, such as a processor responsive to inter-integrated circuit ($I^2C$) control signals, receiving control signals for selectively operating the light heads 704 of the light bar 702 to selectively generate visual emergency warning signals in response to operator input.

A light bar interface 710, such as a series inductance 711, has an input side adapted to be connected to the electrical power line wires 706 connected to the battery 712 for receiving power. The interface 710 has an output side connected to the light bar 702 for supplying power to the light bar. The interface 702 isolates the electrical wires 706 from electrical noise generated by the light bar 702. This isolation allows signals to be transmitted on the power line wires 706 without interference from any spurious signals, such as surges, generated by the light bar 702.

Figure 5:
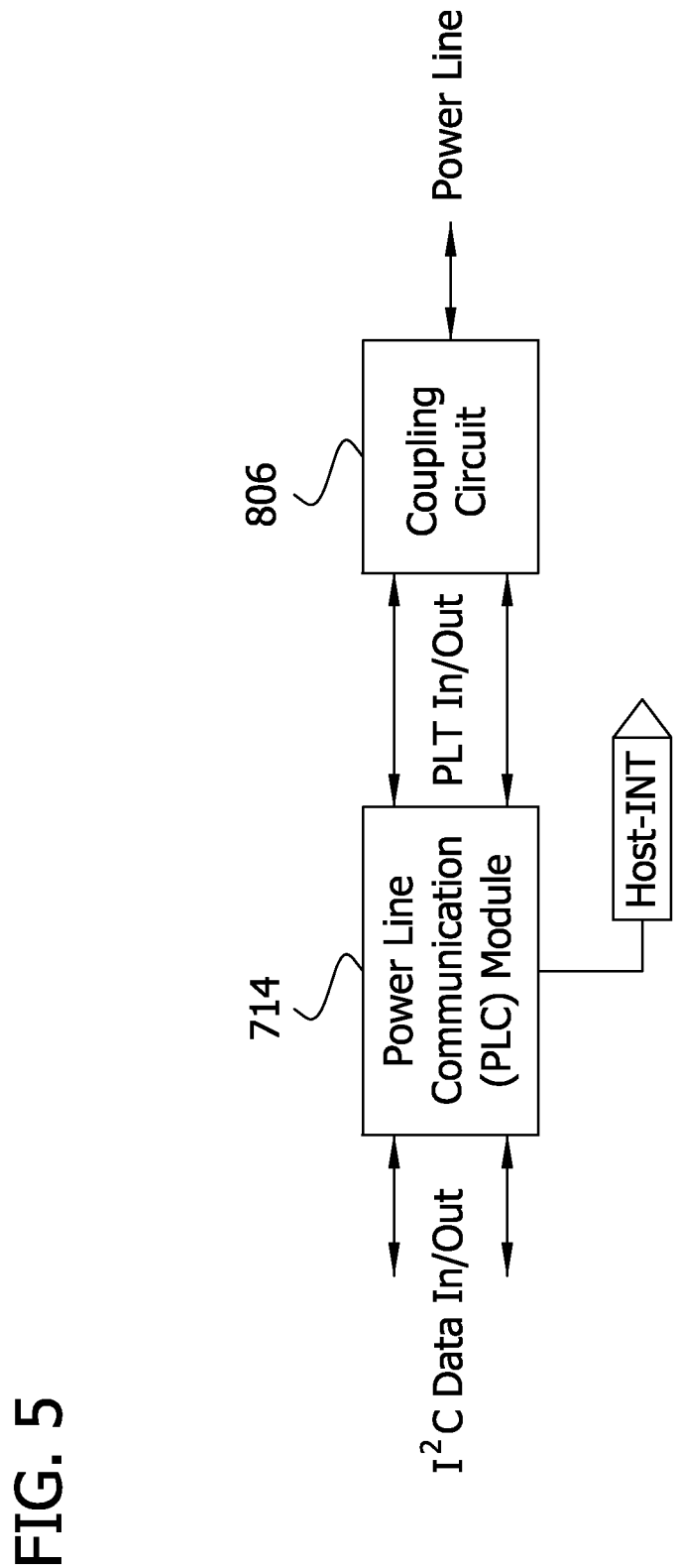
FIG. 5 is a diagram of a power line communication (PLC) module and coupling circuit according to one aspect of the invention.

A light bar power line communication (PLC) module 714 and coupling circuit 806, as shown in FIG. 5, is adapted to be connected between the light bar controller 708 and the electrical wires 706 on the input side of the interface 710 for receiving control signals carried by the electrical wires 706 and for providing corresponding control signals to the controller 708. For example, the PLC module 714 converts control signals in the form of power line transceiver (PLT) packets received on the power lines 706 into corresponding control signals in the form of inter-integrated circuit ($I^2C$) control signals provided via the coupling circuit 806 and via the power lines to the light bar controller 708. The control signals provided to the controller 708 indicate to the light bar controller 708 various patterns of visual emergency warning signals for selectively operating the light heads 704.

A control head 716 generates control signals (e.g., $I^2C$ signals) in response to operator interaction with the control head 716. The control signals control the visual emergency warning signals of the light bar 702. In addition, if the system 700 includes a siren (see below), the control head 716 may optionally generate siren control signals (e.g., $I^2C$ signals) in response to operator interaction with the control head 716.

A control head power line communication PLC module 718 is the same as the PLC module 714 since this module communicates in both directions. In particular, each PLC module converts control signals (e.g., PLT packets) such as received on the power lines 706 via the interface 710 into corresponding control signals (e.g., $I^2C$ signals) such as provided to the controller 708, as noted above. In addition, each PLC module converts control signals (e.g., $I^2C$ signals) such as received from the control head 716 into corresponding control signals ((e.g., PLT packets) such as provided to and transmitted over the power lines 706. Thus, the module 718 is connected to the control head 716 for receiving light bar control signals from the control head 716. The module is also connected to the power lines 706B and converts the received light bar control signals into corresponding light bar control signals provided to and transmitted over the power line wires 706. In addition, if the system 700 includes a siren (see below), the PLC module 718 is connected to the control head 716 for receiving siren control signals from the control head 716. The module is also connected to the power lines 706B and converts the received siren control signals into corresponding siren control signals provided to and transmitted over the power line wires 706.

If the system 700 includes an optional siren 722, a siren interface 726 similar to interface 710 is used. The interface 726 (e.g., series inductor 727) has an input side adapted to be connected to the electrical power line wires 706 for receiving power and has an output side for supplying power to the siren 722. The siren 722 has a power input adapted to be connected to the output side of the siren interface 726 for receiving power. The siren 722 comprises a sound generator 723 connected to the power input for receiving power for energizing the sound generator 723. The siren 722 also has a siren controller 724 for receiving control signals for selectively operating the sound generator 723 to generate audible warning signals in response to received control signals. The siren interface 727, when connected between the power input of the siren 722 and the electrical wires 706B, isolates the electrical wires 706 from electrical noise generated by the siren 722.

A siren power line communication module 728 including coupling circuit 806 which is the same PLC module as noted above, including coupling circuit 806, is also used between the controller 724 and the power lines 706B. In particular, module 728 is adapted to be connected between the siren controller 724 and the electrical wires 706 on the input side of the siren interface 726 for receiving control signals (e.g., PLT packets) carried by the electrical wires 706 and for providing corresponding control signals (e.g., $I^2C$ signals) to the siren controller 724. Thus, the control signals (e.g., $I^2C$ signals) generated by the control head 716 in response to operator input are provided to the control head communication module 718 which provides corresponding control signals (e.g., PLT packets) via an accessory outlet 720 connected to the electrical wires 706 to the siren communication module 728 which provides corresponding control signals (e.g., $I^2C$ signals) to the siren controller 724 to selectively energize the sound generator 723 by power provided via the siren interface 726 to generate the audible warning signals.

In one embodiment the PLC modules 714, 718, 728 illustrated in FIGS. 2 and 5 comprise model number CY8CPLC10 manufactured by Cypress Semiconductor. This Cypress PLC receives I²C signals and provides power line transceiver (PLT) packets corresponding thereto as the light bar and siren control signals transmitted over the power line wires 706. In addition, this Cypress PLC receives the power line transceiver (PLT) packets from power lines 706 and provides I²C signals corresponding thereto as the light bar and siren control head signals provided to the light bar controller 708 and the siren controller 724. The PLC modules 714, 718, 728 are illustrated as a separate component. It is contemplated that the PLC modules may be part of the controllers 708, 724 for the light bar 702 and siren 722 and/or part of the control head 716.

In summary of the operation, the light bar control signals (e.g., I²C signals) generated by the control head 716 are converted by the control head PLC module 718 to corresponding light bar control signals (e.g., PLT packets) transmitted over the power line wires 706B to the light bar PLC module 714. The PLC module 714 converts the received light bar control signals (e.g., PLT packets) into corresponding light bar control signals (e.g., I²C signals) provided to the light bar controller 708 to control the light heads 704 to generate a particular visual emergency warning signals as indicated by the operator action with the control head 716. Similarly, the siren control signals (e.g., I²C signals) generated by the control head 716 are converted by the control head PLC module 718 to corresponding siren control signals (e.g., PLT packets) transmitted over the power line wires 706B to the siren PLC module 728. PLC module 728 converts the received siren control signals (e.g., PLT packets) into corresponding siren control signals (e.g., I²C signals) provided to the siren controller 724 to control the siren 722 to generate particular audio emergency warning signals as indicated by the operator action with the control head 716.

Figure 1:
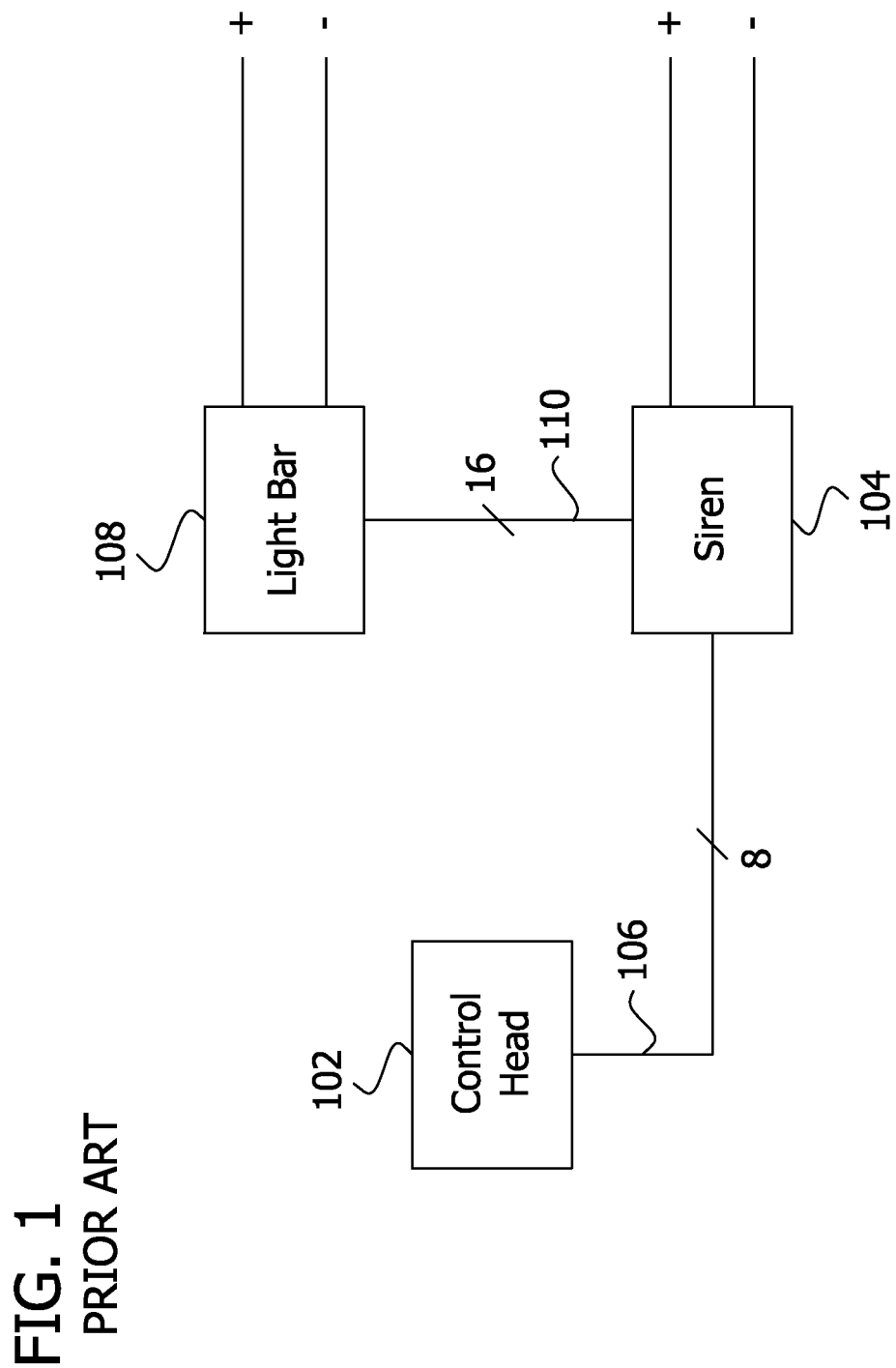
FIG. 1 is a diagram of a light bar, siren and control head according to the prior art.
Figure 3:
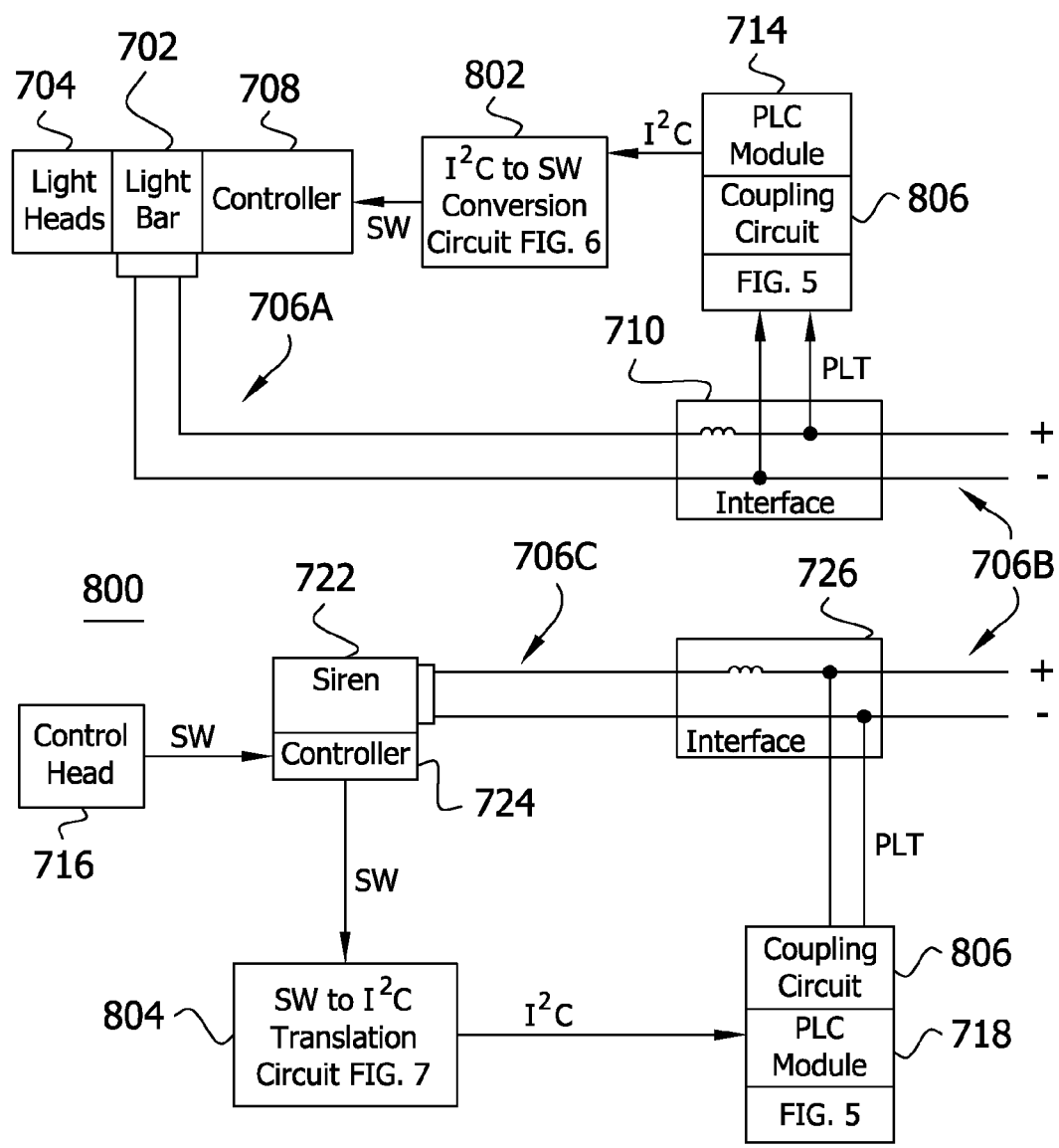
FIG. 3 is a diagram of a light bar/siren and control head according to one embodiment of the invention (a retrofit to a controller such as the controller illustrated in FIG. 1).

FIG. 3:

One retrofit embodiment of a system 800 of the invention is illustrated in FIG. 3. The system 800 is for use with DC power line wires connected to a DC battery of a vehicle. This retrofit embodiment is for use with a controller 716 which interfaces directly with the siren and generates switching signals (SW) which would normally be provided to the siren controller and the siren would provide corresponding switching signals to the light bar controller, as illustrated in FIG. 1.

As in FIG. 2, the light bar 702 has light heads 704 and is adapted to be connected to the power line wires 706A. The light bar 702 includes a light bar controller 708, such as a processor responsive to switch signals, controlling the light heads 704 of the light bar 702 to selectively generate visual emergency warning signals.

The light bar interface 710 is the same as shown in FIG. 2 and is adapted to be connected to the power line wires 706B between the battery 712 and the light bar 702 for isolating the power line wires 706B from the light bar 702.

Figure 6:
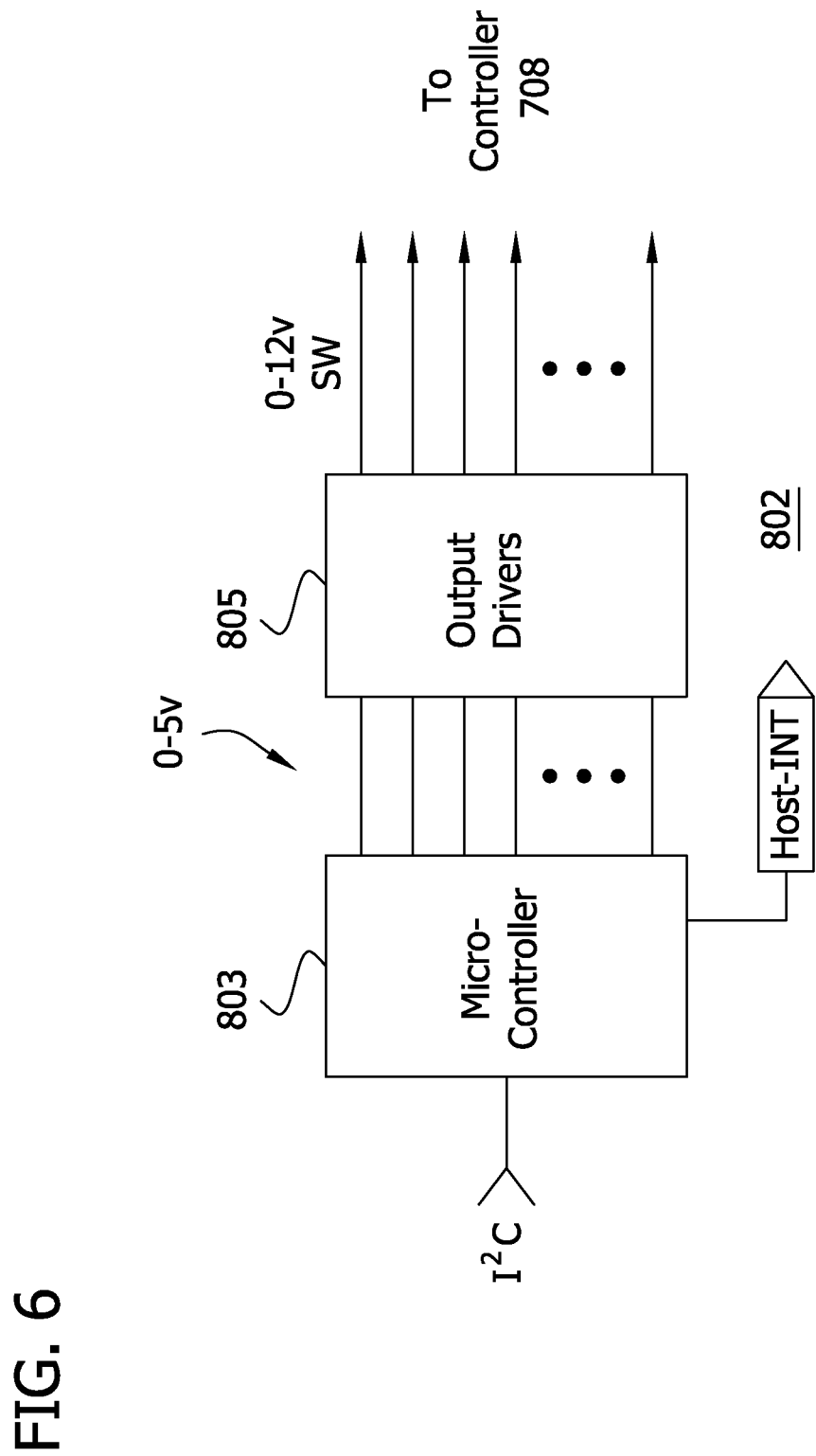
FIG. 6 is a diagram of a conversion circuit between a light bar controller and a PLC module for converting inter-integrated circuit ($I^2C$) control signals from a PLC module into switch control signals provided to provided to a light bar controller, according to one aspect of the invention (retrofit).

A light bar conversion circuit 802 shown in FIG. 6 is connected to the light bar controller 708 for receiving signals from the PLC module (e.g., I²C signals) and converting the received signals into corresponding switching signals SW provided to the light bar controller 708.

The light bar power line communication PLC module 714 is the same as shown in FIGS. 2 and 5, and is connected to the light bar conversion circuit 802 for receiving light bar control signals LBCS (PLT packets) and for converting the received light bar control signals LBCS into corresponding I²C signals provided to the light bar conversion circuit 802.

An optional coupling circuit 806, shown in FIG. 5, may be connected to the light bar PLC module 714. It is adapted to be connected to the power line wires 706B between the light bar interface 710 and the battery 712. The light bar coupling circuit 806 receives light bar control signals (e.g., PLT packets) from the power line wires 706 and provides corresponding light bar control signals (e.g., PLT packets) to the light bar PLC module 714. The purpose of the coupling circuit 806 is to adjust the voltage levels of the PLT packets received on the power lines 706 to match the required voltage levels of the inputs of the control signals (e.g., PLT packets) provided to the PLC module 714.

The control head 716 generates light bar and siren switch signals SW in response to operator interaction with the control head 716 to control the visual emergency warning signals of the light bar 702 and the audible signals of the siren 722. The siren 722 is adapted to be connected to the power line wires 706C. The siren 722 has a siren controller 724 receiving the siren switch signals SW for controlling the siren 722 to selectively generate audible emergency warning signals. The siren controller 724 receives and transmits the light bar switch signals SW to a translation circuit 804.

The siren interface 726 is adapted to be connected to the power line wires 706B between the battery 712 and the siren 722 isolates the power line wires 706B from the siren 722. The translation circuit 804 shown in FIG. 7 connected to the siren controller 724 receives and converts the light bar switching signals SW into corresponding I²C signals.

The line communication PLC module 718 is connected to the translation circuit 804 for receiving and converting the I²C signals into light bar control signals (e.g., PLT packets) provided to the power lines 706.

An optional coupling circuit 806, shown in FIG. 5, may be connected to the control head PLC module 714. It is adapted to be connected to the power line wires 706B between the siren interface 726 and the battery 712. The coupling circuit 806 receives control signals (e.g., PLT packets) from the control head PLC module 718 and provides corresponding control signals (e.g., PLT packets) to the power lines 706B. The purpose of the coupling circuit 806 is to adjust the voltage levels of the PLT packets provided to the power lines 706B as compared to the voltage levels of the outputs of the control signals (e.g., PLT packets) of the PLC module 718.

In operation, the light bar switch signals SW generated by the control head 716 are transmitted by the siren controller 724 to the translation circuit 804, which converts the switch signals SW into I²C signals. The I²C signals are converted by the PLC module 718 into light bar control signals (e.g., PLT packets) transmitted via the coupling circuit 806 over the power line wires 706B and transmitted via the light bar coupling circuit 806 to the light bar PLC module 714. Module 714 converts the received light bar control signals (e.g., PLT packets) into I²C signals provided to the light bar conversion circuit 802 which provides corresponding light bar switching signals SW to the light bar controller 708 to control the light heads 704 to generate a particular visual emergency warning signals as indicated by the operator action with the control head 716.

The siren switch signals SW generated by the control head 716 are provided to the siren controller 724 to control the siren 722 to generate a particular audio emergency warning signals as indicated by the operator action with the control head 716.

Figure 4:
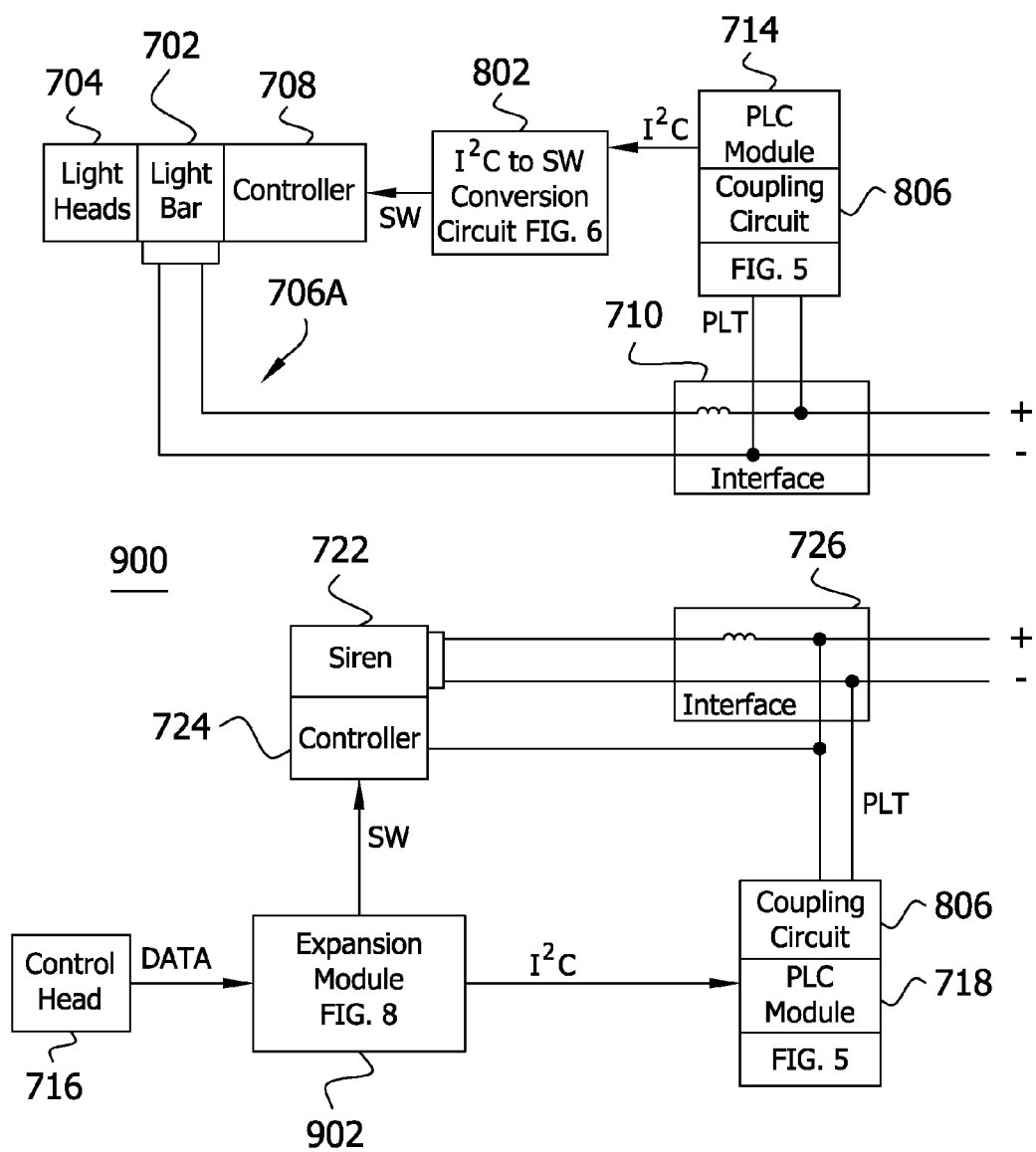
FIG. 4 is a diagram of a light bar/siren and control head according to one embodiment of the invention (Remote Lighted Siren or "RLS" retrofit).

FIG. 4:

Another retrofit embodiment of a system 900 of the invention is illustrated in FIG. 4. This retrofit embodiment is for use with a Remote Lighted Siren or "RLS" controller 716, such as manufactured and sold by Code 3, which interfaces directly with the siren and generates data signals (Data). In general, the data signals may be any format or protocol, such as RS232 or a format or protocol which is based on or a variation of RS232. The data signals would normally be provided to the siren controller and the siren would convert the data signals into corresponding switching signals provided to the light bar controller, as illustrated in FIG. 1, via the wire harness 110.

Figure 8:
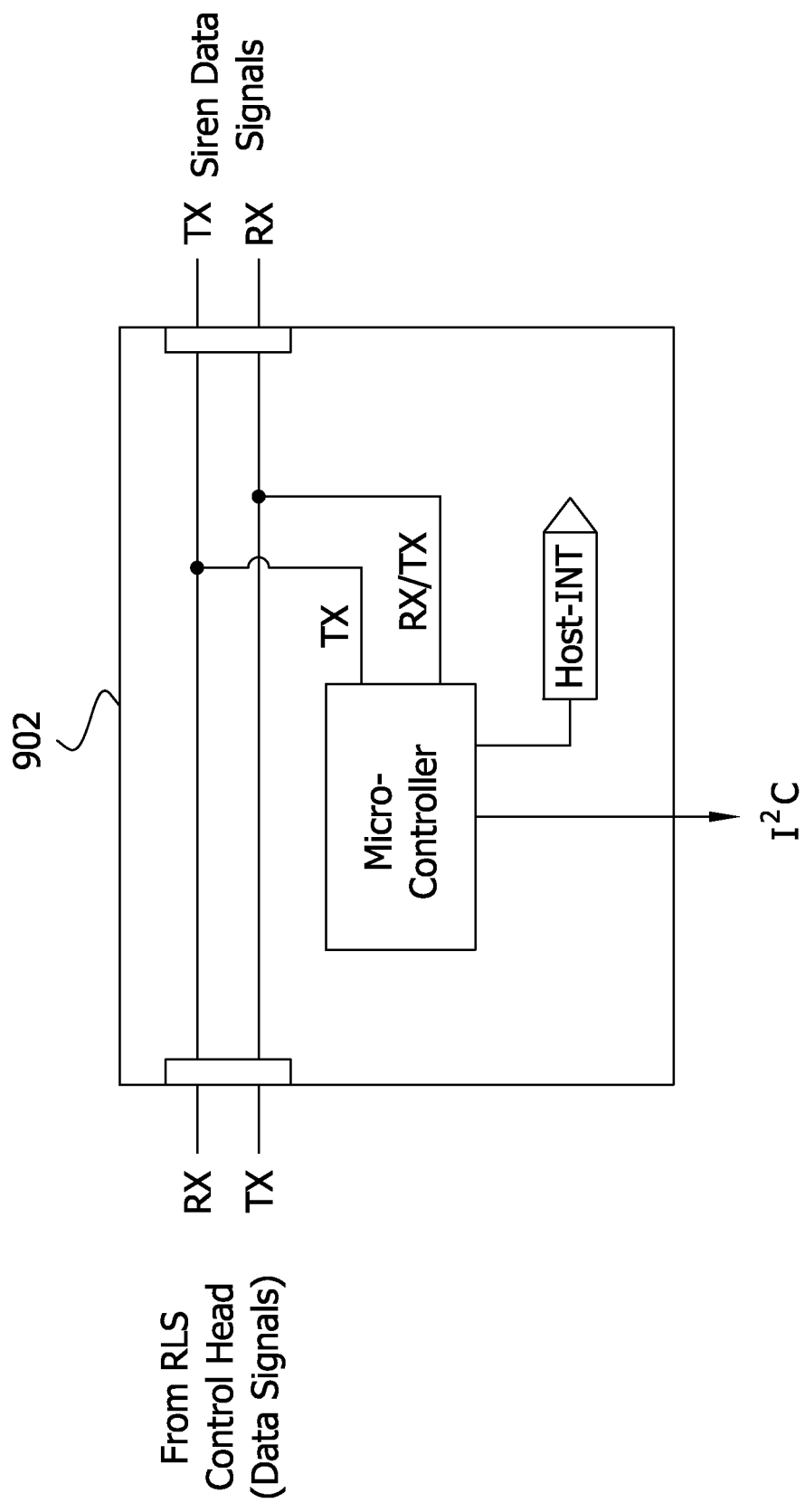
FIG. 8 is a diagram of an expansion module between a control head on one side and a siren controller and a PLC module on the other side, the expansion module for converting switch signals from the control head into inter-integrated circuit ($I^2C$) control signals provided to the PLC module and for interconnecting the control head and the siren to provide switch signals from the control head to the siren controller, according to one aspect of the invention (retrofit).

The system 900 is for use with DC power line wires 706 connected to a DC battery of a vehicle. This retrofit embodiment is for use with a controller 716 which generates switch signals SW and interfaces directly with an expansion module 902 as shown in FIG. 8 (e.g., an RLS system). The purpose of the expansion module 902 is to provide an interface between the control head 716 on one side and the siren controller 724 and PLC module 718 on the other side. The translation circuit 804 and the expansion module 902 perform the same operations to the extent that each converts light bar switch signals SW into I²C signals. One difference between the translation module 804 and the expansion module 902 is that the translation module 804 does not process siren switch control signals SW because the control head 716 in FIG. 3 is directly connected to the siren controller 724 so that the siren switch signals SW are directly provided from the control head 716 to the siren controller 724. In contrast, the expansion module 902, in addition to converting light bar switch signals SW into I²C signals also transmits siren switch control signals SW from the control head 716 to the siren controller 724.

FIGS. 5-8

FIG. 5 is a diagram of the power line communication (PLC) module 714 and the coupling circuit 806 according to one aspect of the invention.

FIG. 6 is a diagram of the conversion circuit 802 between the light bar controller 708 and the PLC module 714 for converting inter-integrated circuit (I²C) control signals from the PLC module 714 into corresponding 0-5 volt switch control signals which are converted by output drivers 805 into corresponding 0-12 volt switch signals provided to the light bar controller 708, according to one aspect of the invention (in a retrofit).

Figure 7:
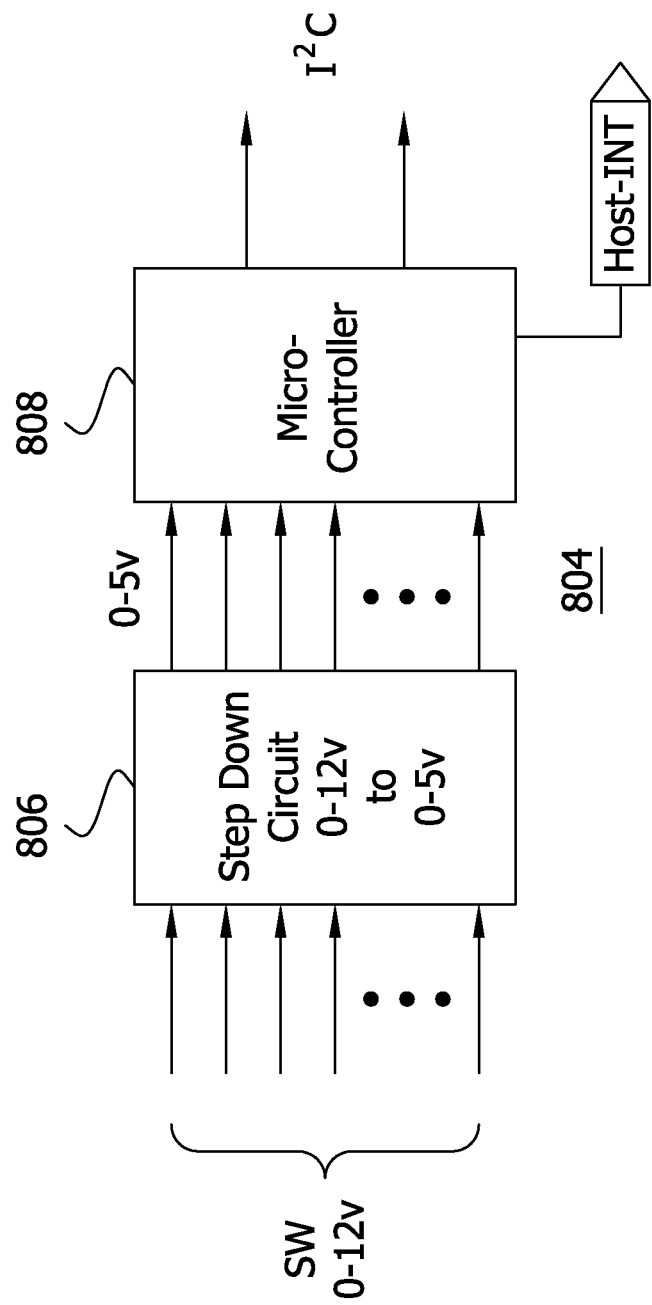
FIG. 7 is a diagram of a translation circuit between a siren controller and a PLC module for converting switch control signals from the siren controller into inter-integrated circuit ($I^2C$) control signals provided to the PLC module, according to one aspect of the invention (retrofit).

FIG. 7 is a diagram of a translation circuit 804 between the siren controller 724 and the PLC module 718. The translation circuit 804 includes a step down circuit which converts 0-12 volt switch control signals SW from the siren controller 724 (and originating from the control head 716) into corresponding 0-5 volt switch signals. The 0-5 volt signals provided to a micro-controller 808 which converts them into corresponding inter-integrated circuit (I²C) control signals provided to the PLC module 718, according to one aspect of the invention (in a retrofit).

FIG. 8 is a diagram of the expansion module 902 between the control head 716 on one side and the siren controller 724 and the PLC module 718 on the other side, according to one aspect of the invention (in a retrofit). The expansion module 902 converts data signals from the control head 716 into inter-integrated circuit (I²C) control signals provided to the PLC module 716 for controlling the light bar 702. The expansion module 902 also transmits the data signals from the control head 716 to the siren controller 724 (e.g., siren data signals) for controlling the siren 722.

The embodiments of the PLC module 714 of FIG. 5, the conversion circuit 802 of FIG. 6 (which is illustrated as a microcontroller), the translation circuit 808 of FIG. 7 (which is illustrated as a microcontroller) and the expansion module 902 in FIG. 8 (which is illustrated as including a microcontroller) are each shown with a host interrupt (Host-INT) input/output port which permits communication and timing coordination. For example, in FIGS. 3 and 4, the PLC module 714 and the conversion circuit 802 would coordinate the transfer of I²C signals from the PLC module 714 to the conversion circuit 802 via the host interrupt (Host-INT) input/output port. As another example, in FIG. 3, the translation circuit 804 and the PLC module 718 would coordinate the transfer of I²C signals from the translation circuit 804 to the PLC module 718 via the host interrupt (Host-INT) input/output port. As another example, in FIG. 4, the expansion module 902 and the PLC module 718 would coordinate the transfer of I²C signals from the expansion module 902 to the PLC module 718 via the host interrupt (Host-INT) input/output port.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of data and/or computer-executable instructions, such as program modules, stored one or more tangible computer storage media and executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computers and/or servers may execute the computer-executable instructions such as those illustrated herein to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules on a tangible computer readable storage medium. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A warning system for a vehicle having a battery and having electrical wires connected to the battery, said system comprising:

An inductively isolating interface having an input side adapted to be connected to the electrical wires for receiving power and having an output side for supplying power;

A light bar having a power input adapted to be connected to the output side of the inductively isolating interface for receiving power, having light heads connected to the power input for receiving power for energizing the light heads and having a light bar controller for receiving control signals for selectively operating the light heads to generate visual warning signals in response to received control signals, wherein the inductively isolating interface is configured to be connected between the power input and the electrical wires to inductively isolate the electrical wires from the light bar thereby isolating the electrical wires from electrical noise generated by the light bar;

A light bar PLT/I$^2$C communication module adapted to be connected between the light bar controller and the electrical wires on the input side of the inductively isolating interface for receiving power line transceiver (PLT) control signals carried by the electrical wires and for converting the received PLT control signals into corresponding inter-integrated circuit (I$^2$C) control signals provided to the light bar controller;

A control head responsive to operator input for providing control signals; and

A control head I$^2$C/PLT communication module adapted to be connected between the control head and the electrical wires for receiving the I$^2$C control signals provided by the control head and for converting the received I$^2$C control signals into corresponding PLT control signals provided to the electrical wires wherein the inductively isolating interface inductively isolates the provided PLT control signals from electrical noise generated by the light bar;

wherein I$^2$C control signals generated by the control head in response to operator input are provided to the control head I$^2$C/PLT communication module which provides corresponding PLT control signals via the electrical wires to the light bar communication module which provides corresponding I$^2$C control signals to the light bar controller to selectively energize the light heads by power provided to the light heads via the inductively isolating interface to generate the visual warning signals.

2. The warning system of claim 1 further comprising:

An inductive siren interface having an input side adapted to be connected to the electrical wires for receiving power and having an output side for supplying power;

A siren having a power input adapted to be connected to the output side of the inductive siren interface for receiving power, having a sound generator connected to the power input for receiving power for energizing the sound generator and having a siren controller for receiving control signals for selectively operating the sound generator to generate audible warning signals in response to received control signals, wherein the inductive siren interface is configured to be connected between the power input of the siren and the electrical wires to inductively isolate the electrical wires from the siren thereby isolating the electrical wires from electrical noise generated by the siren;

A siren PLT/I$^2$C communication module adapted to be connected between the siren controller and the electrical wires on the input side of the inductive siren interface for receiving power line transceiver (PLT) control signals carried by the electrical wires and for converting the received PLT control signals into corresponding inter-integrated circuit (I$^2$C) control signals provided to the siren controller;

wherein I$^2$C control signals generated by the control head in response to operator input are provided to the control head I$^2$C/PLT communication module which provides corresponding PLT control signals via the electrical wires to the siren communication module which provides corresponding I$^2$C control signals to the siren controller to selectively energize the sound generator by power provided via the inductive siren interface to generate the audible warning signals.

3. The system of claim 2 further comprising a translation circuit adapted to be connected between the control head and the control head I$^2$C/PLT communication module, wherein the control head is adapted to be connected to the siren controller which is connected to the translation circuit and wherein the translation circuit converts switching signals provided by the control head to I$^2$C signals provided to the control head I$^2$C/PLT communication module.

4. The system of claim 2 further comprising an expansion module adapted to be connected between the control head and the control head communication module and wherein the expansion module is adapted to be connected to the siren controller.

5. The warning system of claim 2, wherein the interface comprises an inductor in series with a wire connected to a positive terminal of the battery.

6. The system of claim 1 further comprising a conversion circuit adapted to be connected between the light bar communication module and the controller of the light bar for converting $I^2C$ control signals provided by the light bar communication module into switching signals provided to the controller of the light bar.

7. The warning system of claim 1, wherein the interface comprises an inductor in series with a wire connected to a positive terminal of the battery.

8. The warning system of claim 1 further comprising a plug adapted to be connected to engage an accessory outlet of the vehicle, said plug connected to an output of the light bar communication module such that the light bar communication module is adapted to be connected to the electrical wires via the plug engaging the accessory outlet of the vehicle.

9. A warning system for a vehicle having a battery and having electrical wires connected to the battery, said system comprising:
An inductive isolator having an input side adapted to be connected to the electrical wires for receiving power and having an output side for supplying power;
A light bar having a power input adapted to be connected to the output side of the inductive isolator for receiving power, having light heads connected to the power input for receiving power for energizing the light heads and having a light bar controller for receiving inter-integrated circuit ($I^2C$) control signals for selectively operating the light heads to generate visual warning signals in response to received $I^2C$ control signals, wherein the inductive isolator is configured to be connected between the power input and the electrical wires to inductively isolate the electrical wires from the light bar thereby isolating the electrical wires from electrical noise generated by the light bar;
A PLT/$I^2C$ power line communication module adapted to be connected between the light bar controller and the electrical wires on the input side of the inductive isolator for receiving power line transceiver (PLT) control signals carried by the electrical wires and for converting the received PLT control signals into corresponding $I^2C$ control signals provided to the controller;
A control head responsive to operator input for providing $I^2C$ control signals; and
An $I^2C$/PLT power line communication module adapted to be connected between the control head and the electrical wires for receiving the $I^2C$ control signals provided by the control head and for converting the received $I^2C$ control signals into corresponding PLT control signals provided to the electrical wires wherein the inductive isolator inductively isolates the PLT control signals from electrical noise generated by the light bar;
wherein $I^2C$ control signals generated by the control head in response to operator input are provided to the $I^2C$/PLT power line communication module which provides corresponding PLT control signals via the electrical wires to the PLT/$I^2C$ power line communication module which provides corresponding $I^2C$ control signals to the controller to selectively energize the light heads by power provided to the light heads via the inductive isolator to generate the visual warning signals.

10. The warning system of claim 9 further comprising a plug adapted to be connected to engage an accessory outlet of the vehicle, said plug connected to an output of the light bar communication module such that the light bar communication module is adapted to be connected to the electrical wires via the plug engaging the accessory outlet of the vehicle.

11. The warning system of claim 9 further comprising:
An inductive siren interface having an input side adapted to be connected to the electrical wires for receiving power and having an output side for supplying power;
A siren having a power input adapted to be connected to the output side of the inductive siren interface for receiving power, having a sound generator connected to the power input for receiving power for energizing the sound generator and having a siren controller for receiving control signals for selectively operating the sound generator to generate audible warning signals in response to received control signals, wherein the inductive siren interface is configured to be connected between the power input of the siren and the electrical wires to inductively isolate the electrical wires from the siren thereby isolating the electrical wires from electrical noise generated by the siren;
A siren PLT/$I^2C$ communication module adapted to be connected between the siren controller and the electrical wires on the input side of the inductive siren interface for receiving power line transceiver (PLT) control signals carried by the electrical wires and for converting the received PLT control signals into corresponding inter-integrated circuit ($I^2C$) control signals provided to the siren controller;
wherein $I^2C$ control signals generated by the control head in response to operator input are provided to the control head $I^2C$/PLT communication module which provides corresponding PLT control signals via the electrical wires to the siren communication module which provides corresponding $I^2C$ control signals to the siren controller to selectively energize the sound generator by power provided via the inductive siren interface to generate the audible warning signals.

12. The system of claim 11 further comprising a translation circuit adapted to be connected between the control head and the control head communication module and wherein the control head is adapted to be connected to the siren controller which is connected to the translation circuit.

13. The system of claim 11 further comprising an expansion module adapted to be connected between the control head and the control head communication module and wherein the expansion module is adapted to be connected to the siren controller.

14. The warning system of claim 11, wherein the interface comprises an inductor in series with a wire connected to a positive terminal of the battery.

15. The system of claim 9 further comprising a conversion circuit adapted to be connected between the light bar communication module and the controller of the light bar for converting control signals provided by the light bar communication module into switching signals provided to the controller of the light bar.

16. A warning system for a vehicle having a battery and having electrical wires connected to the battery, said system for use with a light bar having a power input for receiving power, having light heads connected to the power input for receiving power for energizing the light heads and having a light bar controller for receiving inter-integrated circuit ($I^2C$) control signals for selectively operating the light heads to generate visual warning signals in response to received $I^2C$ control signals, said system for use with a control head responsive to operator input for providing I²C control signals, said system comprising:

An inductive isolator having an input side adapted to be connected to the electrical wires for receiving power and having an output side adapted to be connected to the power input of the light bar for supplying power to the light bar, wherein the inductive isolator is configured to be connected between the power input and the electrical wires to inductively isolate the electrical wires from the light bar thereby isolating the electrical wires from electrical noise generated by the light bar;

A PLT/I²C power line communication module adapted to be connected between the light bar controller and the electrical wires on the input side of the inductive isolator for receiving power line transceiver (PLT) control signals carried by the electrical wires and for converting the received PLT control signals into corresponding I²C control signals provided to the controller; and An I²C/PLT power line communication module adapted to be connected between the control head and the electrical wires for receiving the I²C control signals provided by the control head and for converting the received I²C control signals into corresponding PLT control signals provided to the electrical wires wherein the inductive isolator inductively isolates the PLT control signals from electrical noise generated by the light bar;

wherein I²C control signals generated by the control head in response to operator input are provided to the I²C/PLT power line communication module which provides corresponding PLT control signals via the electrical wires to the PLT/I²C power line communication module which provides corresponding I²C control signals to the controller to selectively energize the light heads by power provided via the inductive isolator to generate the visual warning signals.

17. The warning system of claim 16 further comprising a plug adapted to be connected to engage an accessory outlet of the vehicle, said plug connected to an output of the second power line communication module such that the second power line communication module is adapted to be connected to the electrical wires via the plug engaging the accessory outlet of the vehicle.

18. A warning system for a vehicle having a battery and having electrical wires connected to the battery, said system comprising:

An inductively isolating interface having an input side adapted to be connected to the electrical wires for receiving power and having an output side for supplying power;

A light bar having a power input adapted to be connected to the output side of the inductively isolating interface for receiving power, having light heads connected to the power input for receiving power for energizing the light heads and having a light bar controller for receiving control signals for selectively operating the light heads to generate visual warning signals in response to received control signals, wherein the inductively isolating interface is configured to be connected between the power input and the electrical wires to inductively isolate the electrical wires from the light bar thereby isolating the electrical wires from electrical noise generated by the light bar;

A light bar PLT/PI communication module adapted to be connected between a processor of the light bar controller and the electrical wires on the input side of the inductively isolating interface for receiving processor input (PI) control signals carried by the electrical wires and for converting the received PLT control signals into corresponding processor input control signals provided to the processor of the light bar controller;

A control head responsive to operator input for providing control signals; and

A control head PI/PLT communication module adapted to be connected between a processor of the control head and the electrical wires for receiving processor input (PI) control signals provided by the processor of the control head and for converting the received PI control signals into corresponding PLT control signals provided to the electrical wires wherein the inductively isolating interface inductively isolates the provided PLT control signals from electrical noise generated by the light bar;

wherein PI control signals generated by the processor of the control head in response to operator input are provided to the control head PI/PLT communication module which provides corresponding PLT control signals via the electrical wires to the light bar communication module which provides corresponding PI control signals to the processor of the light bar controller to selectively energize the light heads by power provided to the light heads via the inductively isolating interface to generate the visual warning signals.

19. The warning system of claim 18 further comprising:

An inductive siren interface having an input side adapted to be connected to the electrical wires for receiving power and having an output side for supplying power;

A siren having a power input adapted to be connected to the output side of the inductive siren interface for receiving power, having a sound generator connected to the power input for receiving power for energizing the sound generator and having a siren controller for receiving control signals for selectively operating the sound generator to generate audible warning signals in response to received control signals, wherein the inductive siren interface is configured to be connected between the power input of the siren and the electrical wires to inductively isolate the electrical wires from the siren thereby isolating the electrical wires from electrical noise generated by the siren;

A siren PLT/PI communication module adapted to be connected between the siren controller and the electrical wires on the input side of the inductive siren interface for receiving power line transceiver (PLT) control signals carried by the electrical wires and for converting the received PLT control signals into corresponding processor input (PI) control signals provided to the siren controller;

wherein PI control signals generated by the control head in response to operator input are provided to the control head I²C/PLT communication module which provides corresponding PLT control signals via the electrical wires to the siren communication module which provides corresponding PI control signals to the siren controller to selectively energize the sound generator by power provided via the inductive siren interface to generate the audible warning signals.

* * * * *